W. E. HOLLAND AND J. M. SKINNER.
BATTERY GRID.
APPLICATION FILED JAN. 9, 1919.
1,364,760.
Patented Jan. 4, 1921.
3 SHEETS—SHEET 1.
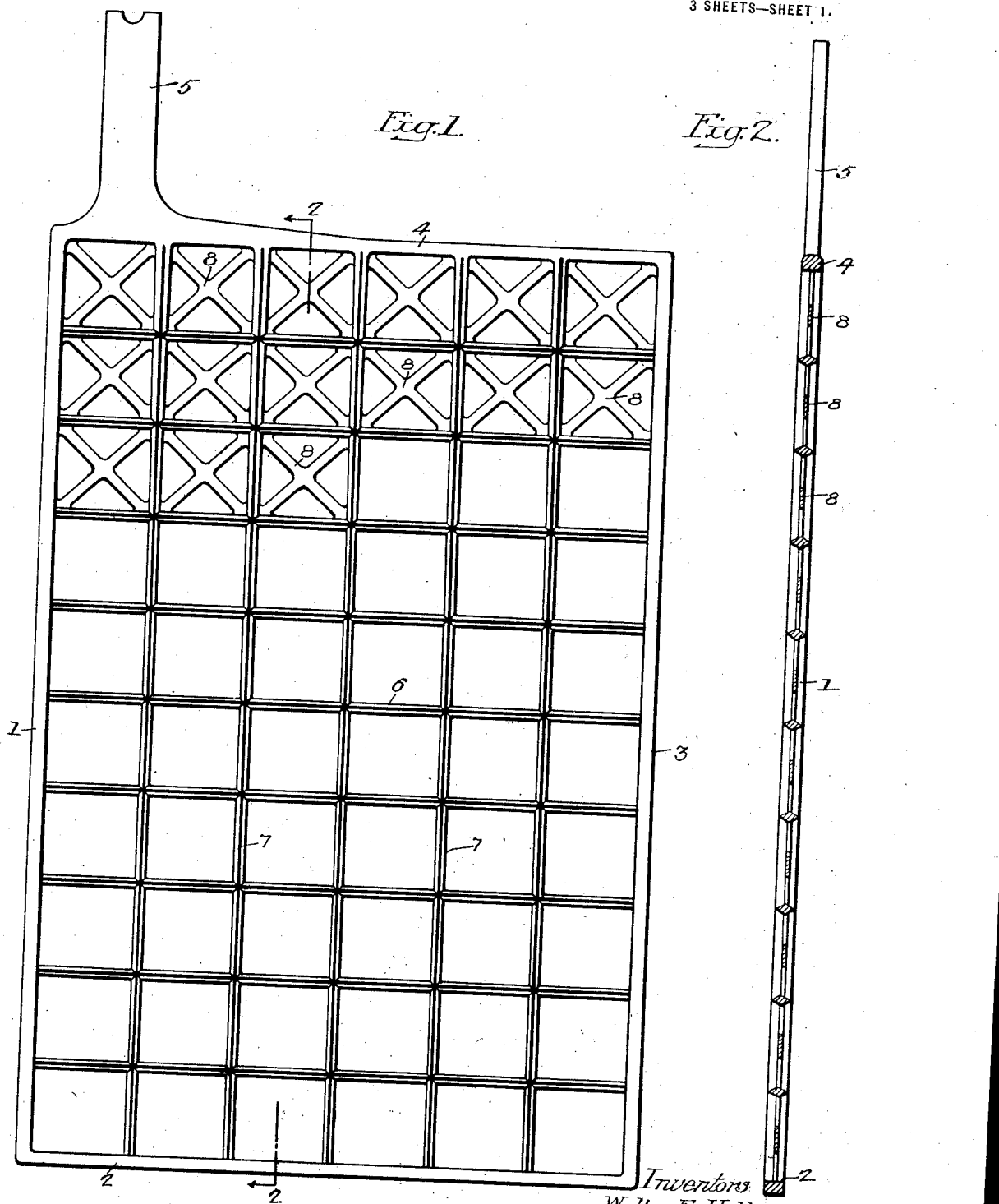
Inventors
Walter E. Holland,
James M. Skinner,
by their Attorneys
Howson & Howson

W. E. HOLLAND AND J. M. SKINNER.
BATTERY GRID.
APPLICATION FILED JAN. 9, 1919.

1,364,760.

Patented Jan. 4, 1921.
3 SHEETS—SHEET 2.

Inventors,
Walter E. Holland,
James M. Skinner
by their Attorneys,
Howson & Howson

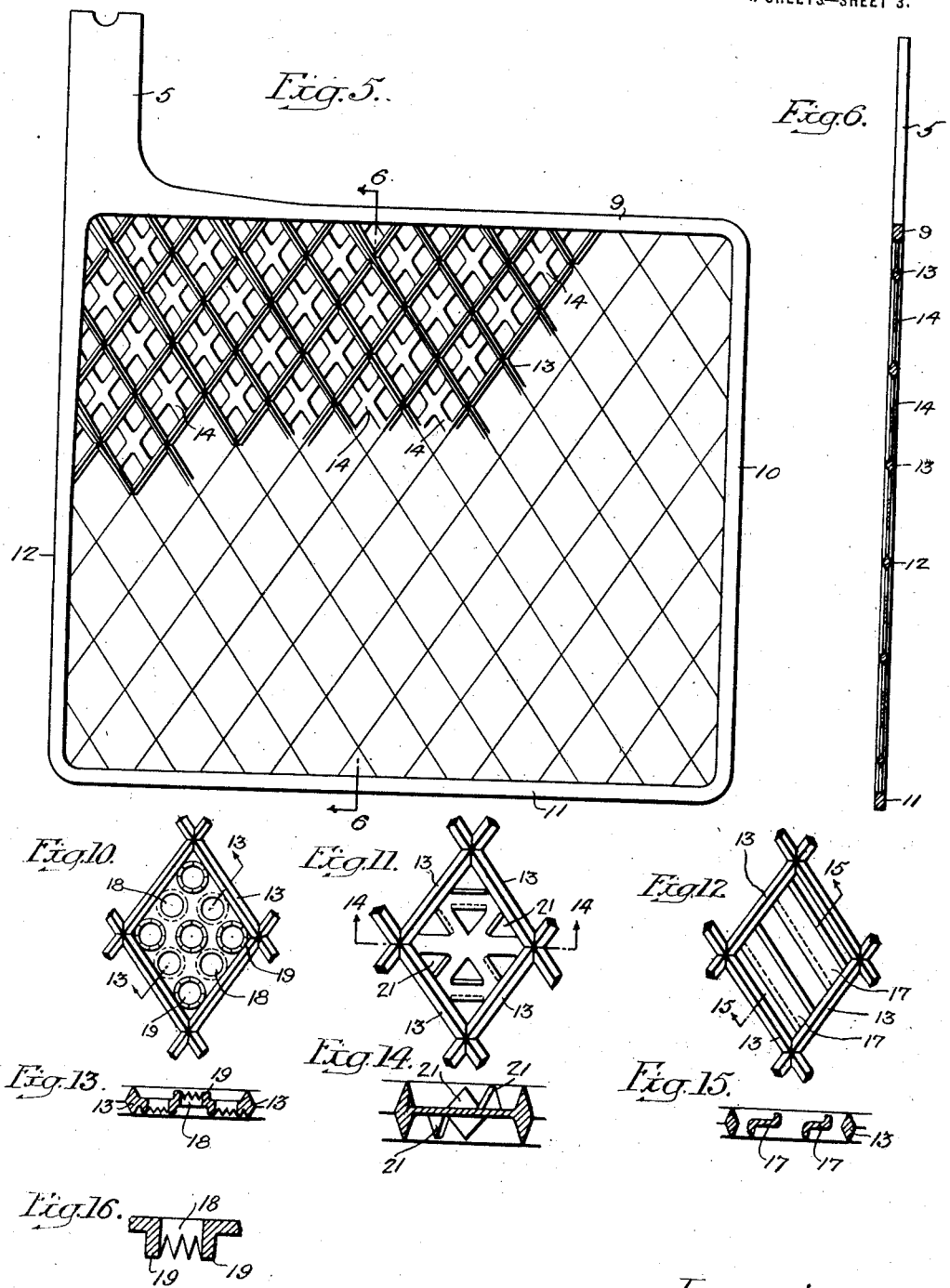

UNITED STATES PATENT OFFICE.

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

BATTERY-GRID.

1,364,760.   Specification of Letters Patent.   Patented Jan. 4, 1921.

Application filed January 9, 1919. Serial No. 270,416.

*To all whom it may concern:*

Be it known that we, WALTER E. HOLLAND and JAMES M. SKINNER, citizens of the United States, residing in Philadelphia, Pennsylvania, have invented Battery-Grids, of which the following is a specification.

One object of our invention is to provide a structure especially adapted for use as a grid or supporting frame for storage battery plates, which shall have its members so disposed that while it may be made as a casting, it is particularly adapted for manufacture by a coining process or by subjecting a blank to pressure between suitable dies.

We further desire to provide a practical form of relatively thin, light battery grid which may be struck up or shaped by forming dies of relatively simple construction and which shall have its parts so disposed as to effectually retain the active material of a finished plate in place under conditions of use as well as insure good and extensive electrical contact between its frame and said active material;—the construction of the grid being such that in the finished plate there is a maximum amount of active material at and adjacent the faces thereof where it will be the most useful while a large proportion of the grid metal is at the center plane where it is covered and protected from oxidation with active material.

Another object of our invention is to provide a grid which in addition to possessing certain strength-giving members of comparatively large section, so disposed as to serve as main supports and conductors, also includes a large number of relatively light, thin members formed and disposed to insure good electrical contact with the active material and serving as intermediate supporting members between the larger members.

These objects and other advantageous ends we attain as hereinafter set forth, reference being had to the accompanying drawings, in which, Figure 1 is a front elevation of a storage battery grid constructed according to our invention;

Fig. 2 is a vertical section on the line 2—2, Fig. 1;

Fig. 5 is a front elevation illustrating a slightly modified form of our invention;

Fig. 6 is a section on the line 6—6, Fig. 5;

Figure 3:
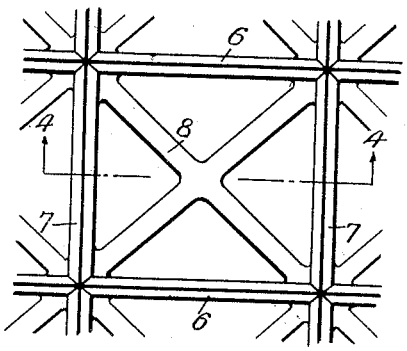
Fig. 3 is an enlarged elevation of one section or panel of the grid shown in Figs. 1 and 2.
Figure 4:
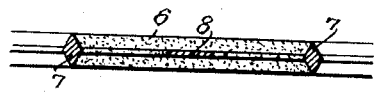
Fig. 4 is a transverse section on the line 4—4, Fig. 3, showing the active material in the position occupied in the finished plate.
Figure 7:
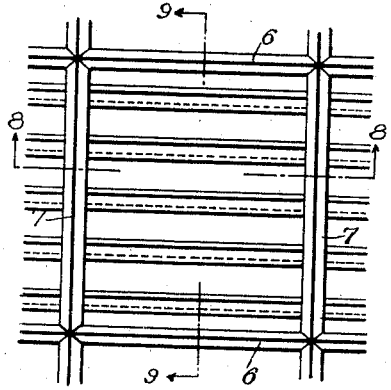
Fig. 7 is an enlarged elevation of a panel of another modified form of grid.
Figure 9:
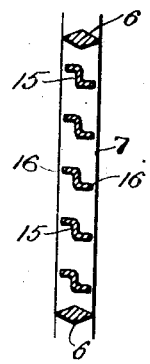
Figure 8:
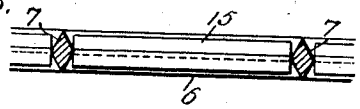

Figs. 8 and 9 are transverse sections on the lines 8—8 and 9—9, respectively, Fig. 7;

Figs. 10 to 12 inclusive are elevations of panels showing other modifications of our invention;

Figs. 13 to 15 inclusive are transverse sections on the lines 13—13, Fig. 10, 14—14, Fig. 11 and 15—15, Fig. 12; and Fig. 16 is a transverse section on an enlarged scale further illustrating the detail construction of a part of the grid shown in Fig. 10.

In Figs. 1 to 4 inclusive 1, 2, 3 and 4 represent the marginal frame members of a storage battery grid which is shown as of substantially rectangular outline and has projecting from one end of the last of said members a lug or strip portion 5. In this particular case the side members 1 and 3 are connected by a series of parallel spaced transverse members 6 and the top and bottom members 2 and 4 are similarly connected by a parallel series of longitudinal frame members 7 extending at right angles to the members 6 and coöperating with them to define a series of open rectangular panels. Both the longitudinal and transverse members are preferably of diamond section and the marginal members are substantially rectangular in section but with sufficient draft or taper to permit of their being formed either by a casting or coining operation.

In each of the panels is formed a relatively thin web 8 lying in a plane substantially midway between and parallel with the planes of the two faces of the grid, and formed in the present instance of two intersecting members extending diagonally of the panel. Each web has thus four openings and while relatively light and thin as compared with the supporting frame members 1—7, is none the less sufficiently stiff and heavy to perform its functions as an auxiliary member.

A grid having the above described construction is not only of a relatively simple form but has its parts so disposed as to permit of easy manufacture by a pressing or coining process such as that described and claimed in our application for U. S. Patent No. 260,193, dated October 29, 1918, or by the process of our application No. 260,194, dated October 29, 1918, as well as by the common casting process. With such a relatively strong and yet light construction we have found that a storage battery plate made by applying active material to fill in the various panels flush with the faces of the grid is likewise relatively strong and light with said material not only firmly held in place in the grid but also in electrical engagement with the relatively extended surfaces provided by the webs 8. It is especially to be noted that inasmuch as these webs are embedded in and inclosed by the active material, they do not reduce in any way the superficial or exposed area of the latter although they serve to provide low resistance paths for the current flowing between all parts of this material and the main frame members, thus insuring that the plate as a whole shall possess relatively high capacity and conductivity.

By a slight modification of our invention we may provide a relatively heavy main marginal frame 9—12, preferably of generally rectangular form which serves to support two series of intersecting frame members 13 so arranged as to define a series of diamond shaped panels and themselves of substantially diamond-shaped section. As before there is in each of the panels a perforated web indicated at 14, Figs. 5 and 6, consisting of a relatively thin metal sheet, which like the web 8 of Figs. 1 and 2, is integral with the main frame members and lies in a plane preferably though not necessarily midway between the planes of the faces of the grid. In this case the perforations in each web are of diamond shaped outline, so that in effect such web consists of two parallel elements extending between the centers of opposite sides of each panel so as to intersect each other.

According to another modification of our invention the frame provided by the main frame members 6 and 7 has its web formed with a series of parallel transversely elongated perforations so that in effect it consists of a series of thin parallel strips or plates 15, Figs. 7–9. In order to strengthen these as well as to increase their surface available for engagement with the active material, we so form the grid that the longitudinal edges of each of said strips 15 are projected in opposite directions at right angles to the general plane of the web. In order to thus form the web we preferably displace or force out the material ordinarily occupying the openings or perforations,— the edges 16 of the latter terminating in planes below the planes of the outside faces of the grid as defined by the frame members 6 and 7, so that as before no part of the web is exposed on the outer faces of the finished plate which thus possesses a maximum exposed surface of active material.

The web of the grids having diamond shaped panels may be formed as in Figs. 7 to 9, by providing it with parallel elongated perforations as shown in Figs. 12 and 15, so that said web is divided into a member of thin parallel strips 17 extending between two of the opposite sides 13 of each panel and having their edges projected at right angles to their bodies.

In another form of our invention (Figs. 10, 13 and 16), we form the web with a series of circular perforations 18 from the edges of which the displaced material extends in the form of jagged or serrated projections 19 at right angles to its general plane. Obviously certain of these extensions may be formed to project from one face of the web and certain others from the opposite faces thereof.

As will be understood by those skilled in the art, the form of the perforations in the web of the various panels may be indefinitely varied without departing from our invention and the material displaced from the openings formed may be either removed or may be projected substantially at right angles to the plane of the web,—the arrangement being such that any projections terminate preferably some distance below the planes defined by the opposite faces of the main frame members so that when active material has been applied there is no portion of any of the webs exposed.

Another practical form of web is constructed as shown in Figs. 11 and 14 where we have shown a grid panel in which the flat thin web has triangular perforations 20 each having a projecting lip or extension 21 of generally triangular form.

In any case our invention is characterized by the provision of series of intersecting relatively heavy main frame members arranged to define panels of the desired form in each of which is a perforated web formed by a thin generally flat sheet of metal integral with said frame members formed to lie substantially midway between the two faces of the grid and having openings made either with or without projecting edge portions. The active material applied to such a grid completely incloses the various webs of the panels, which, having relatively large superficial areas, insure that there shall be good electrical connection between all parts of said material and the main frame members. Said webs also serve to lock the active material in place, since it extends through their openings and is agglomerated or so held together that it does not easily become disintegrated. The plates made with grids constructed in accordance with our invention are lighter as well as higher in conductivity and capacity for a given structural strength than it has hitherto been commercially practicable to construct and in addition are well adapted for manufacture by coining or pressing from blank sheets or cast blanks.

We claim:

1. A grid consisting of main frame members; with integral relatively thin perforated webs of sheet metal extending between said frame members.

2. A grid consisting of main intersecting frame members defining open panels; with relatively thin flat perforated webs of sheet metal in said panels substantially midway between the planes of the opposite faces of the grid.

3. A grid consisting of marginal frame members and intersecting main frame members supported thereby in positions to define open panels; with integral relatively thin perforated webs of sheet metal mounted respectively in the panels and lying in a plane substantially midway between the planes defined by the opposite faces of said main frame members.

4. A grid consisting of main frame members arranged to define open panels, each having mounted in it an integral web of relatively thin sheet metal having openings provided with edge portions projecting at right angles to its plane.

5. A grid having main intersecting frame members defining open panels; and webs of thin sheet metal in said panels having serrated portions projecting at right angles to their plane.

6. A grid consisting of a series of main intersecting frame members defining open panels; and relatively thin, flat laterally extended auxiliary members in each of said panels between opposite portions thereof.

7. A grid consisting of a marginal frame and relatively heavy intersecting frame members defining open panels; with relatively light flat members constituting a sheet like web in each of said panels lying in a plane substantially midway between the planes of the opposite faces of said frame members.

8. A grid formed of a compressed body of metal including relatively heavy main frame members defining open panels; and relatively light flat perforated webs of thin sheet metal mounted in said panels respectively.

9. A storage battery grid of compressed metal including relatively heavy main frame members defining open panels; with relatively light flat perforated webs of thin sheet metal mounted in said panels respectively, and having their marginal portions serrated and projected at right angles to their plane.

10. A storage battery grid consisting of relatively heavy main frame members arranged to define open panels; with webs for said panels consisting of thin perforated sheets of metal, the marginal portions of certain of said perforations projecting at right angles to their plane in one direction and the similar portions of others of said perforations projecting in an opposite direction.

11. A storage battery grid consisting of relatively heavy main frame members of substantially diamond shaped section; with webs of thin flat sheet metal mounted in panels defined by said main frame members and lying in a plane parallel to the planes defined by the faces of said main frame members.

In witness whereof we affix our signatures.

WALTER E. HOLLAND.
JAMES M. SKINNER.